Oct. 28, 1924.

J. D. GARLICK 1,512,921

TRANSMISSION GEARING FOR MOTOR DRIVEN VEHICLES

Filed March 1, 1924 3 Sheets-Sheet 1

Inventor
James D. Garlick
By
J. E. Thomas Attorney

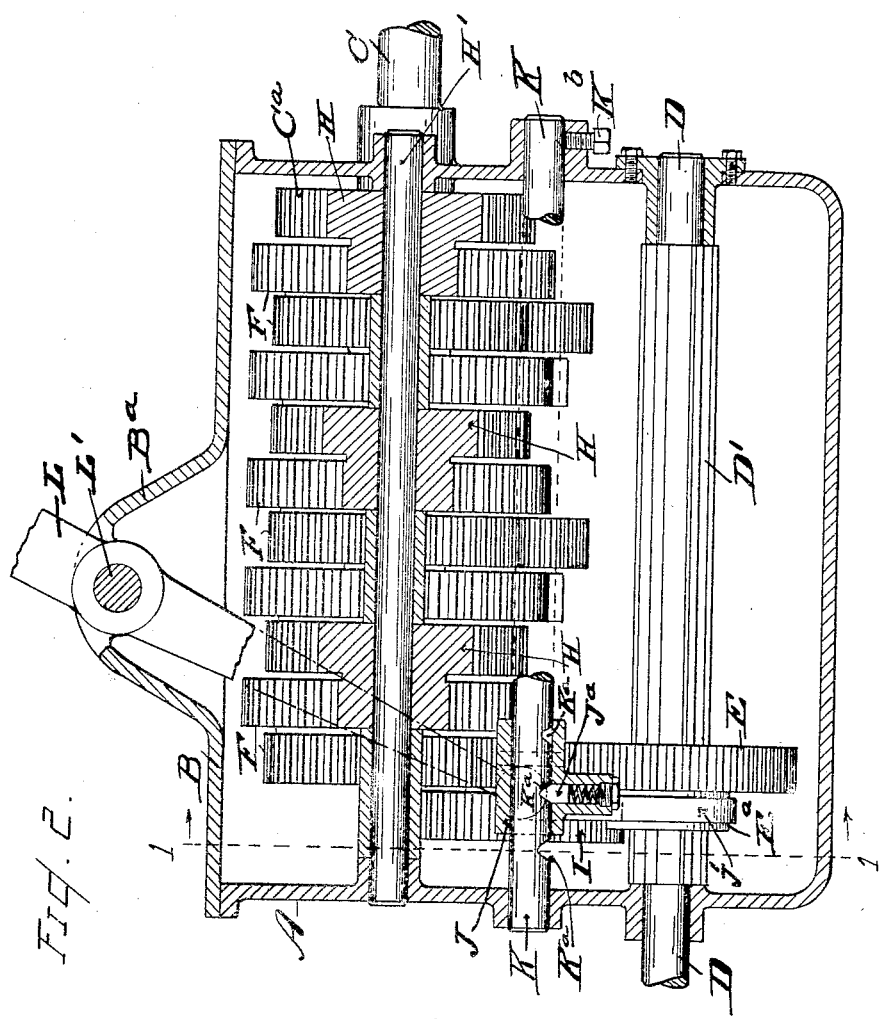

Oct. 28, 1924.

J. D. GARLICK 1,512,921

TRANSMISSION GEARING FOR MOTOR DRIVEN VEHICLES

Filed March 1, 1924     3 Sheets-Sheet 3

James D. Garlick, Inventor

By S. E. Thomas

Attorney

Patented Oct. 28, 1924.

1,512,921

UNITED STATES PATENT OFFICE.

JAMES D. GARLICK, OF PORT HURON, MICHIGAN.

TRANSMISSION GEARING FOR MOTOR-DRIVEN VEHICLES.

Application filed March 1, 1924. Serial No. 696,157.

*To all whom it may concern:*

Be it known that I, JAMES D. GARLICK, a citizen of the United States, residing at Port Huron, county of St. Clair, State of Michigan, have invented a certain new and useful Improvement in Transmission Gearing for Motor-Driven Vehicles, and declare the following to be a full, clear, and exact description of the same, such as will enable others skilled in the art to which it pertains to make and use the same, reference being had to the accompanying drawings, which form a part of this specification.

My invention relates to transmission gearing for motor driven vehicles shown in the accompanying drawings and more particularly described in the following specification and claims.

The object of this invention is to provide a change-speed gearing in which a train of stepped change-speed gear wheels—constantly coupled together by a plurality of stepped idler gear wheels mounted on a pair of counter-shafts adjacent the driving shaft—are adapted to actuate a propeller shaft at varying speeds upon shifting a manually controlled slidable gear wheel, keyed to an extension of the propeller shaft, into intermeshing relation with the respective change-speed gear wheels—the driver being thus enabled to operate the vehicle from a relatively low speed to the maximum speed of the engine and back to zero,—or in a reverse direction, rapidly and quietly, without danger of clashing the gears when shifting from one speed to another.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 2 is a longitudinal vertical sectional view taken on or about the stepped dash-line 2—2 of Figure 1.

Figure 1:
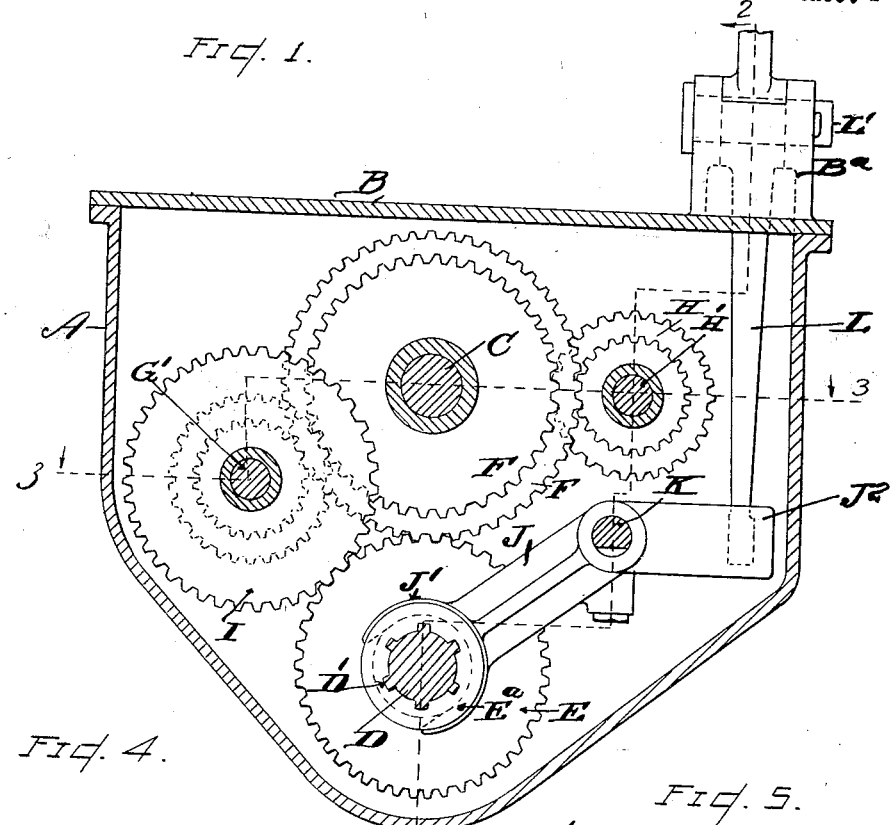
Figure 1 is a vertical cross-sectional view through the gear case, with parts in elevation, showing the driving and propeller shafts of a motor driven vehicle,—a train of connecting stepped gears,—a shifting gear, and manually controlled shifting means.
Figures 4, 5:
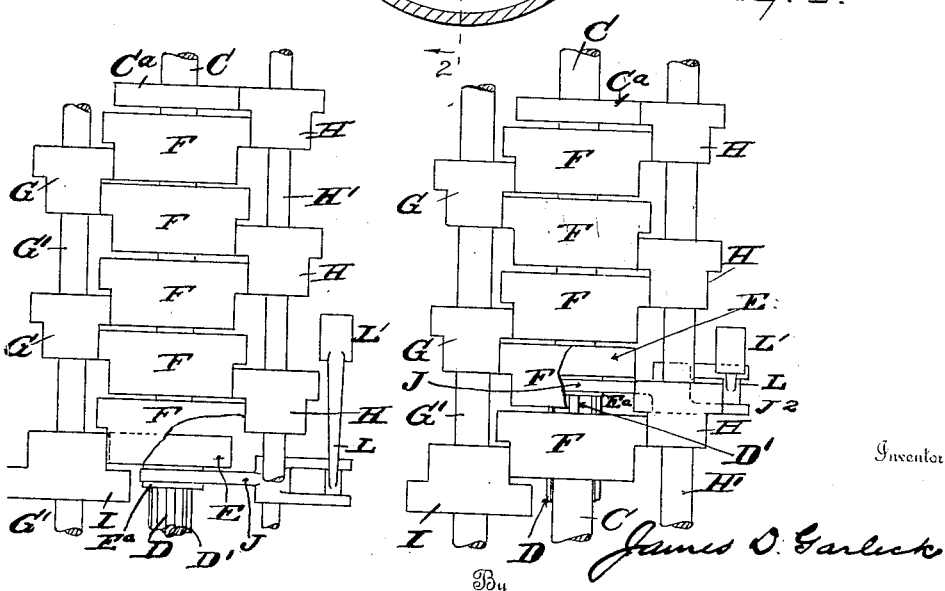
Figure 4 is a diagrammatic view showing one of the stepped idler-gears carried by the driving shaft broken away to disclose the shifting gear beneath in "neutral" position.
Figure 5 is a similar diagrammatic view showing the second speed stepped idler-gear on the driving shaft broken away to disclose the shifting gear beneath in mesh therewith.
Figure 3:
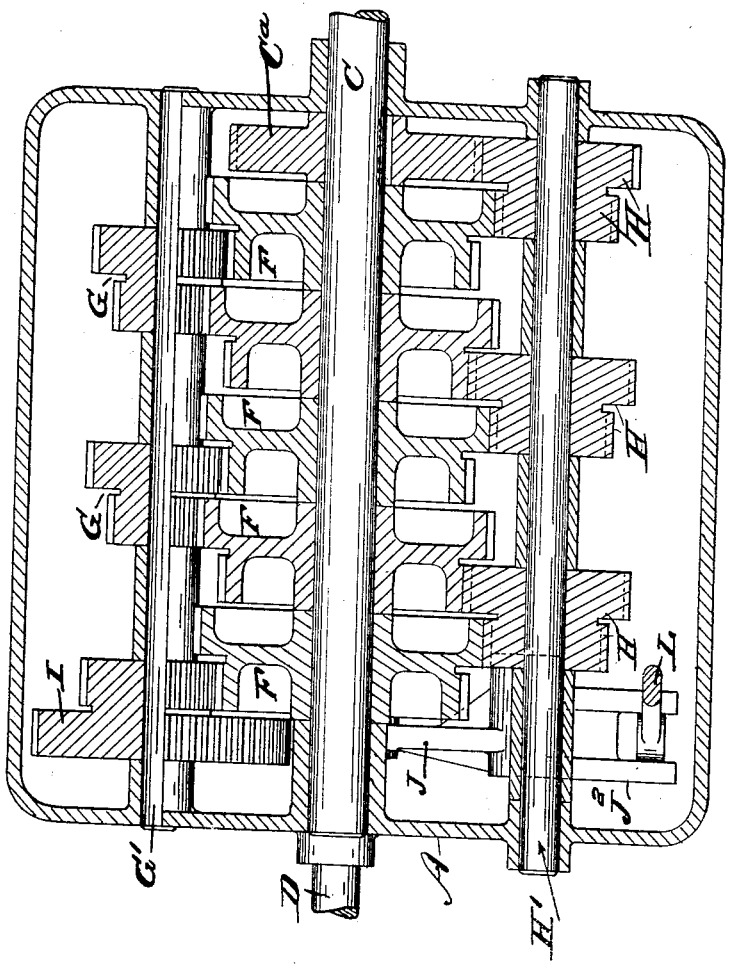
Figure 3 is a horizontal sectional view taken on or about the stepped dash-line 3—3 of Figure 1.

Referring now to the letters of reference placed upon the drawings:

A, denotes a gear case adapted to be secured to the frame of a motor vehicle—not shown.

B, designates its cover plate.

C, indicates the driving shaft, connected with an engine—not shown.

D, represents an extension of the propeller shaft, connected by a universal joint in the usual manner with the propeller shaft—not shown—of the vehicle. The extension shaft D is actuated by a slidable shifting gear E mounted upon an enlarged splined portion $D^1$ of the shaft D, within the gear case. The shifting gear E is adapted to be successively moved into intermeshing relation with a plurality of stepped change-speed idler gears F, loosely mounted upon the shaft C which in turn intermesh with a plurality of stepped idler coupling gears G and H loosely mounted on the respective counter-shafts $G^1$ and $H^1$ supported in the end walls of the gear case on each side of the driving shaft. The respective stepped gears being in permanent intermeshing relation, changes in the speed of the propeller shaft are obtained by manually shifting the gear E into intermeshing relation with the respective change-speed gears F, mounted upon the driving shaft.

$C^a$ denotes a driving gear keyed to the driving shaft C in mesh with one of the coupling gears H.

I, represents a reversing gear mounted on the shaft $G^1$ and when the shifting gear E is brought into intermeshing relation therewith through the operation of the rocking arm L, by the manual operation of a shifting lever—not shown—the vehicle may be driven in a backward direction, as will be readily understood.

Any suitable manually operated means may be employed for shifting the gear E into intermeshing relation with the respective change-speed gears F—that shown in the drawings forms no feature of the invention but is a well known construction in which a slidable shifting arm J, forked to engage the grooved hub $E^a$ of the shifting gear E, is mounted upon a shaft K supported in the walls of the gear case.

$J^a$ indicates a spring actuated dog or detent, sleeved in the wall of the forked arm, adapted to successively enter a plurality of notches $K^a$ formed in the shaft K, to yieldingly maintain the shifting gear E when adjusted in mesh with the respective change-speed gears, F or the reversing gear I.

The shifting arm J is forked at $J^1$ to engage the grooved hub $E^a$ of the shifting gear E and is actuated by a rocking arm L, pivoted at $L^1$ in the upstanding lugs $B^a$ in the cover of the gear case. The lower end of the rocking arm L extends into an upper forked end $J^2$ of the slidable shifting arm and when rocked by a suitable controlling lever—not shown—serves to shift the gear E along the splined shaft $D^1$ into intermeshing relation with the respective change-speed gears.

$K^b$ denotes a set screw extending through a hub in the gear case to secure the shaft K against accidental release.

Having indicated the several parts by reference letters the construction and operation of the device will now be understood.

Any desired number of stepped change-speed gears may be mounted upon the driving shaft coupled together by the idler gears G and H and with the driving gear $C^a$ keyed to the driving shaft. The driver of the car may rapidly and progressively move the shifting gear into intermeshing relation with the change-speed gears and thus rapidly increase or decrease the speed of the vehicle without danger of clashing the gears, or when in neutral position the shifting gear may be caused to intermesh with the reverse gear, thus changing the direction of the vehicle and without the employment of the usual clutch mechanism.

Having thus described my invention what I claim is:

1. In a device of the character described; a driving shaft; a driving gear keyed to the driving shaft; a plurality of gears loosely mounted upon the driving shaft; a plurality of idler gears adapted to couple the respective gears of the driving shaft together as a unit with the driving gear, whereby they may be actuated by said driving gear at varying speeds; a driven shaft; a gear keyed to but slidable upon said last named shaft adapted to actuate the latter and manually operated means adapted to shift said slidable gear progressively into intermeshing relation with the gears of the driving shaft, whereby the driven shaft may be actuated to drive the vehicle at varying speeds in a forward direction, or into intermeshing relation with one of the idler gears, whereby the driven shaft may be reversed to drive the vehicle rearwardly.

2. In a device of the character described; a driving shaft; a driving gear keyed to the driving shaft; a plurality of stepped gears loosely mounted upon the driving shaft; a plurality of stepped idler gears adapted to couple the respective stepped gears of the driving shaft together as a unit with the driving gear, whereby they may be actuated by said driving gear at varying speed; a driven shaft; a slidable gear keyed to said last named shaft, whereby the latter may be actuated, and manually operated means adapted to shift said slidable gear progressively into intermeshing relation with the several stepped gears of the driving shaft, whereby the driven shaft will be actuated to drive the vehicle at varying speeds in a forward direction, or into intermeshing relation with one of the idler gears, whereby the driven shaft may be reversed to drive the vehicle rearwardly.

3. In a device of the character described; a driving shaft; a driving gear keyed to the driving shaft; a plurality of stepped gears loosely mounted upon the driving shaft; a plurality of stepped idler gears grouped on a pair of counter-shafts respectively located on opposite sides of the driving shaft, adapted to couple the respective stepped gears of the driving shaft together as a unit with the driving gear; a driven shaft; a slidable gear keyed to the driven shaft, whereby the latter may be actuated, and manually operated means adapted to shift said slidable gear progressively into intermeshing relation with the several stepped gears of the driving shaft, whereby the driven shaft may be actuated to drive the vehicle at varying speeds in a forward direction—into neutral position— or into intermeshing relation with one of the idler gears, whereby the driven shaft may be reversed to drive the vehicle rearwardly.

In testimony whereof, I sign this specification in the presence of two witnesses.

JAMES D. GARLICK.

Witnesses:
S. E. THOMAS,
C. O. WILSON.